US005370494A

United States Patent [19]

Holmes et al.

[11] Patent Number: 5,370,494

[45] Date of Patent: Dec. 6, 1994

[54] SELF-PROPELLED LIFT TRUCK

[76] Inventors: Arthur J. Holmes, 1803 Rock Fence Dr., Richmond, Tex. 77469; William K. Holmes, 10474 Rock Creek Dr., San Diego, Calif. 92131

[21] Appl. No.: 94,426

[22] Filed: Jul. 13, 1993

[51] Int. Cl.[5] .............................. B60P 3/06; B66F 9/08

[52] U.S. Cl. .............................. 414/635; 414/467; 180/209

[58] Field of Search .............................. 414/467, 631-638; 180/209

[56] References Cited

U.S. PATENT DOCUMENTS

| | | | |
|---|---|---|---|
| 3,071,270 | 1/1963 | Baker | 414/635 |
| 3,375,947 | 4/1968 | Kissilov | 414/467 |
| 3,799,379 | 3/1974 | Grether et al. | 414/467 |
| 3,908,849 | 9/1975 | Carroll | 414/634 |
| 4,061,237 | 12/1977 | Austin et al. | 414/467 |
| 4,266,795 | 5/1981 | Walker | 414/467 X |
| 4,396,341 | 8/1983 | Brouwer et al. | 414/467 |
| 4,460,064 | 7/1984 | Lutz et al. | 414/467 X |
| 4,826,474 | 5/1989 | Holmes | 414/467 X |
| 4,859,133 | 8/1989 | Maria | 414/467 X |
| 5,217,342 | 6/1993 | Grether | 414/467 X |

FOREIGN PATENT DOCUMENTS

| | | | |
|---|---|---|---|
| 2601668 | 7/1976 | Germany | 414/467 |

*Primary Examiner*—David A. Bucci
*Attorney, Agent, or Firm*—Bill B. Berryhill

[57] ABSTRACT

A self-propelled lift truck comprising a forward carriage assembly which includes a pair of spaced apart ground engageable wheels and a vertical mast on which is mounted a forwardly projecting fork assembly for lifting and lowering of loads thereon by relative upward and downward movement and a rearward carriage assembly which includes at least one ground engageable wheel and on which is supported a power source for operating components of the lift truck. The forward and rearward carriage assemblies are connected by first and second transversely spaced apart support members, the forward ends of which are pivotally attached to the forward carriage assembly and the rearward ends of which are pivotally attached to the rearward carriage assembly. A power device is connected to at least one of the support members and is activatable to effect relative angular displacement of the elongated support members with the forward carriage assembly.

20 Claims, 3 Drawing Sheets

SELF-PROPELLED LIFT TRUCK

BACKGROUND OF THE INVENTION

1. Field of the Invention

The present invention pertains to self-propelled lift trucks. More specifically, the present invention pertains to self-propelled lift trucks especially suitable for lifting and lowering of loads onto and from slightly elevated surfaces. Even more particularly, the present invention pertains to self-propelled lift trucks which are suitable for loading and unloading loads onto and from the bed of a truck or trailer designed for street or highway transportation.

2. Description of the Prior Art

Self-propelled lift trucks have been in existence for many years. The typical lift truck comprises a low heavy frame mounted on wheels with lifting forks extending forwardly therefrom. The forks form part of an assembly which is usually mounted for up and down movement on vertical tracks of a vertical mast of some type. The mast may be tipped or slightly inclined toward the rear of the lift truck to prevent spilling of its load. In addition, heavy counterweights are typically attached to the rear of the lift truck to help counterbalance loads carried on the forks at the forward end thereof since the location of the front wheels at the bass of the mast act as a pivot point.

Most self-propelled lift trucks or "forklifts", as they are sometimes called, are typically used for lifting and moving heavy objects from one place to another at the same facility, such as a manufacturing plant. In more recent years, self-propelled lift trucks have been used for loading and unloading heavy loads on and from the beds of trucks or trailers for highway transportation sometimes without the benefit of a loading dock. Lift trucks of this type usually have some type of mast which allows elevation of the lifting forks, and the loads thereon, at more elevated positions than lift trucks or forklifts of the prior art. This allows loading and unloading from the beds of road vehicles. Examples of such self-propelled lift trucks are shown in U.S. Pat. Nos. 3,826,393 and 4,395,190. To prevent such lift trucks from being overly heavy, they may be designed to straddle the load with their wheels so that the center of gravity, when loaded, is between the front and rear wheels. Such wide wheel spread may create problems of accessibility to a load and lowering of loads.

Many cargos are loaded with materials from a concentrated source of such materials and transported to points of use where there are no lift trucks for unloading these materials. Unloading of the delivery vehicle in these cases is very difficult and labor intensive. In addition, such unloading is sometimes accomplished by makeshift methods which are dangerous to personnel involved. For this reason, in recent years, the same lift truck used for loading a vehicle may be loaded on or attached to the vehicle and transported with the load of materials to its ultimate destination where the lift truck is utilized in unloading the materials. In fact, the self-propelled lift trucks of the aforementioned U.S. Pat. Nos. 3,826,39]and 4,395,190 may have been utilized in this manner. However, in transporting such a lift truck by attaching to the load carrying vehicle, the lift truck is typically attached to the rear of the vehicle and hangs in a cantilevered fashion from the rear thereof, typically extending sixty to eighty-four inches rearwardly. Even though the lift trucks designed for this purpose may not be as heavy as some of the lift trucks of the prior art, the fact that the concentration of weight or center of gravity thereof is so far to the rear of the load carrying vehicle's rear axle, may result in accelerated tire wear, instability of the load and less maneuverability of the vehicle. Furthermore, the cantilevered extension of the lift truck to the rear of the vehicle may create safety and traffic hazards and may violate many state traffic laws.

Thus, even though improvements have been made in self-propelled lift trucks which enable the loading and unloading of materials at truck or trailer bed elevations which, in some cases, allows the lift truck to be transported with the load so that it may be used at the point of delivery, further improvements are needed. Self-propelled lift trucks which are capable of loading and unloading trucks without a loading dock and which are easily adapted for transport with the load for use in unloading would find great acceptance in many types of industries.

SUMMARY OF THE PRESENT INVENTION

The present invention is for a self-propelled lift truck of the type having a fork assembly for lifting and lowering of loads thereon, especially suitable for loading and unloading loads at moderately elevated positions such as the bed of a truck or trailer. To accomplish this purpose, the self-propelled lift truck of the present invention includes a forward carriage assembly having a pair of spaced apart ground engageable wheels and a vertical mast on which is mounted a forwardly projecting fork assembly for relative upward and downward movement thereon. A rearward carriage assembly is provided which includes at least one ground engageable wheel and on which may be supported a power source and controls for operating various components of the lift truck. The forward and rearward carriage assemblies are connected by a unique support assembly which comprises first and second transversely spaced apart support members. In a preferred embodiment, there are two pairs of support members each of which has upper and lower elongated members of substantially equal length the forward ends of which are pivotally attached to the forward carriage assembly and the rearward ends of which are pivotally attached to the rearward carriage assembly. The distance between the forward ends of the upper and lower elongated support members is substantially equal to the distance between the rearward ends of the upper and lower elongated members. Thus, each of the pairs of support members and their connection with the forward and rearward carriage assemblies define a parallelogram.

A power device is connected the forward carriage assembly and to at least one elongated support member. If the forward carriage assembly, and thus the forward pivot point of the elongated support members, is restrained, activation of the power device will cause the support members to pivot at their attachment with the forward carriage assembly and move between relatively horizontal positions and relatively vertical positions.

The vertical mast and fork assembly of the self-propelled lift truck of the present invention are operatively connected and provided with power lift apparatus for effecting upward and downward movement of the fork assembly relative to the mast. The mast and the power lift apparatus is so designed that if the fork assembly is restrained in a vertically fixed position, the mast, the carriage assemblies and the support members (the entire lift truck) may be lifted off the ground by the power lift apparatus.

Thus, the self-propelled lift truck of the present invention is capable of loading materials onto and from surfaces which are moderately elevated from the ground, such as the beds of trucks or trailers of road vehicles. In addition, the self-propelled lift truck of the present invention is capable of engagement with the truck or trailer, vertical self-lifting off of the ground and pivoting about it's forward carriage so that the support members pivot up to a position adjacent the mast, elevating the rearward carriage assembly above the forward carriage assembly. This places the lift truck in a traveling position which has substantially less rearward projection minimizing the rearward shift of center of gravity and thereby improving vehicle stability and maximizing traffic safety.

Thus the self-propelled lift truck of the present invention provides a lift truck which provides the lifting capabilities of self-propelled lift trucks of the prior art. Like only a few lift trucks of the prior art, it provides such lifting capabilities suitable for both lifting and unloading of loads onto and off of surfaces such as the bed of a truck or vehicle. Most uniquely, all these features are provided in a self-propelled lift truck which is capable of self-attachment, self-lifting and self-pivoting from a horizontal to a vertical position for transport on the rear of the vehicle. The lift truck of the present invention is easy to operate and does not require unusual manipulation as some of the recently developed transportable lift trucks. Many other objects and advantages of the invention will be apparent from reading the description which follows in conjunction with the accompanying drawings.

DESCRIPTION OF A PREFERRED EMBODIMENT OF THE INVENTION

Figures 1, 1A:
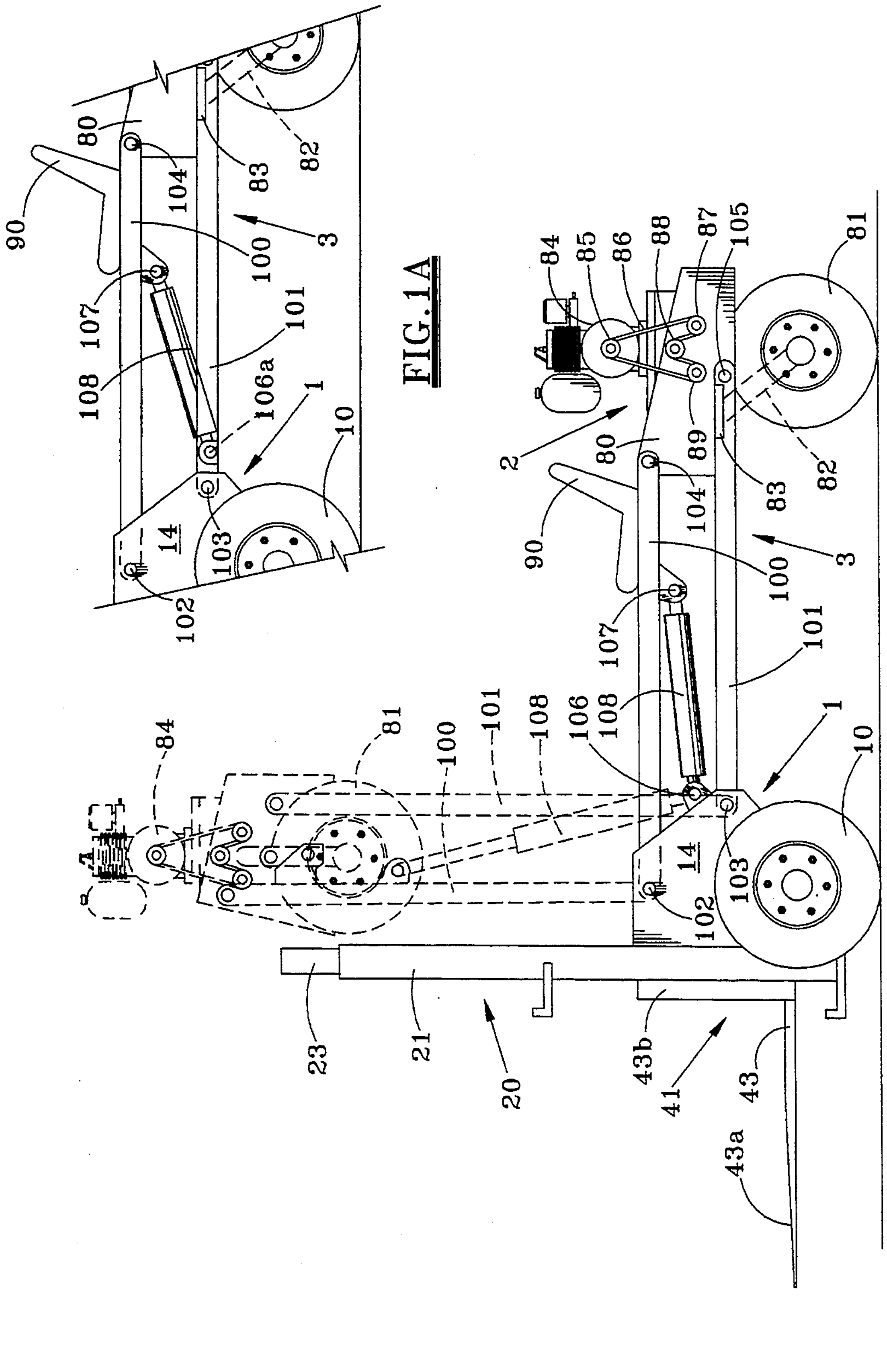
FIG. 1 is a side elevation view of a self-propelled lift truck, according to a preferred embodiment of the invention.
FIG. 1A is a partial side elevation view, similar to FIG. 1, showing an alternate embodiment of the invention.
Figure 2:
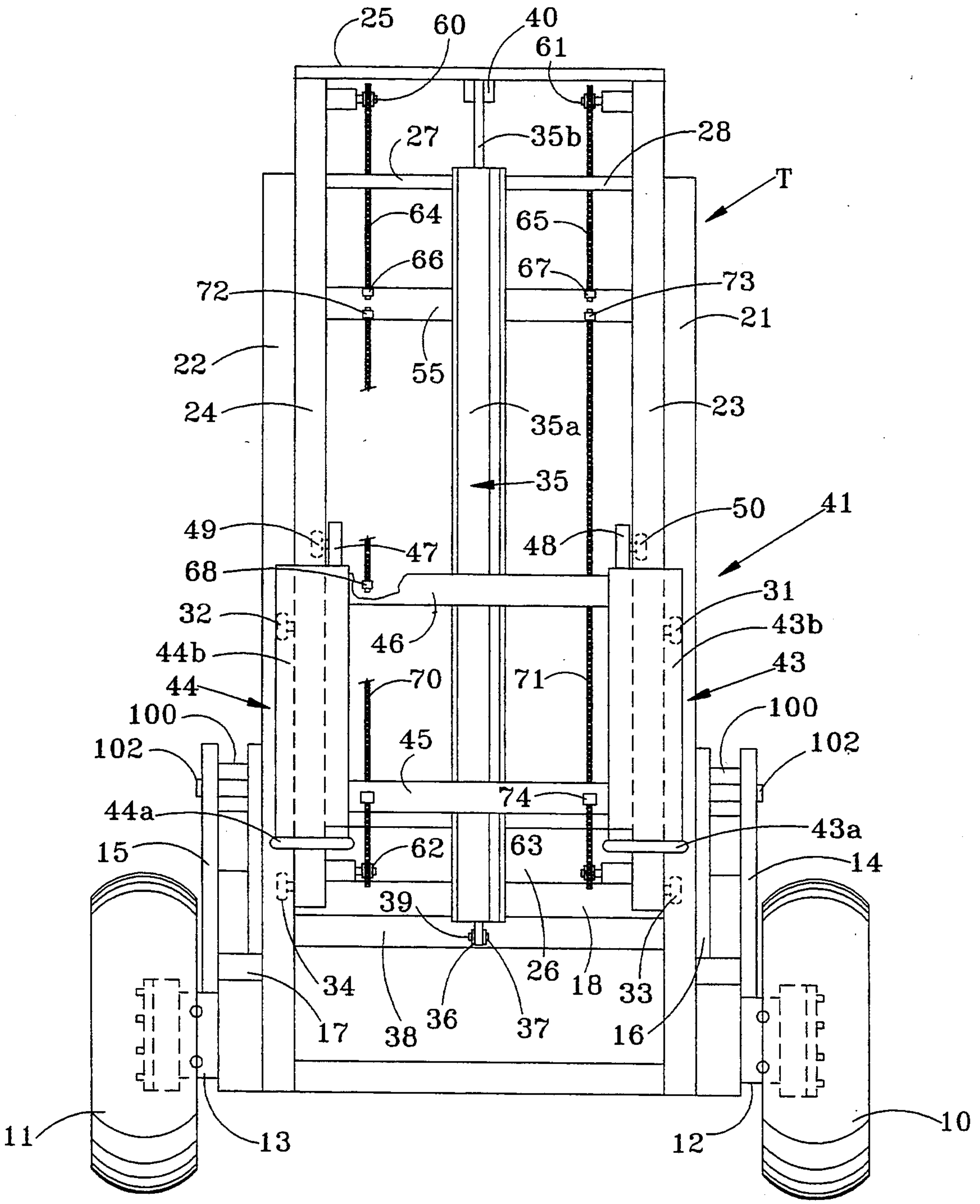
FIG. 2 is a front elevation view, partially in section, of the self-propelled lift truck of FIG. 1, according to a preferred embodiment of the invention.

Referring first to FIGS. 1 and 2, there is shown a self-propelled lift truck T having a forward carriage assembly 1 and a rearward carriage assembly 2 connected by a support assembly 3. The forward carriage assembly includes a pair of spaced apart ground engageable wheels 10,11 driven by hydraulic motors 12,13 connected to variable displacement hydraulic pumps as will be more fully understood hereafter. The forward carriage assembly 1 includes outer support plates 14,15 and inner support plates 16,17 transversely connected by a box beam 18 therebetween.

Supported on the forward carriage assembly 1 is a vertical mast 20 which comprises a fixed outer mast which includes vertical supports 21,22 fixed to the box beam 18 and/or the inner support plates 16 and 17 by welding or the like. The outer mast support members 21 and 22, in the exemplary embodiment, are made of channel members, the open channel of each member 21,22 facing mutually inwardly. Mounted, for reciprocal vertical movement relative to the fixed vertical members 21 and 22 of the outer mast are a pair of inner mast support members 23,24 connected at the upper ends thereof by bar 25. The lower ends of the inner mast support members 23,24 are transversely connected by a structural support 26. The inner mast supports 23 and 24 are also preferably channel members, the open channels of which face mutually inward and to the web portion of which are affixed rollers 31, 32, 33 and 34. These rollers 31, 32, 33 and 34 ride within the channel of outer mast supports 21 and 22, allowing the inner mast to move upwardly or downwardly relative to the outer mast.

To effect such upwardly or downwardly relative motion of the masts, a double acting hydraulic piston and cylinder 35 is provided, the lower end of which is connected through a clevis type connection of extensions 36 and 37 welded to an outer mast cross support 38 and provided with holes co-axially aligned with a corresponding hole at the lower end of the ram 35 through which an interengaging pin 39 passes. Horizontal supports 27,28 attached to outer mast supports 21,22 support the upper end of the cylinder 35*a*. The end of the ram rod 35*b* is connected at 40 to the cross support 25. Thus, extension of the ram 35 raises the inner mast within the outer mast and retraction of the ram 35 lowers the inner mast within the outer mast.

A forwardly projecting fork assembly 41 is mounted on the mast assembly and includes a pair of forks 43,44 transversely connected by cross support members 45 and 46. The forks 43 and 44 have forwardly projecting tines or tongs 43*a*,44*a* bent at a ninety degree angle from the proximal ends 43*b*,44*b* thereof. The proximal portions 43*b*,44*b* of the forks 43,44 are welded to the cross supports 45,46. The tines or prongs 43*a*,44*a* provide the surfaces on which loads to be handled by the lift truck are supported. Welded to the rear of the forks 43,44 and cross support 45,46 are vertical supports 47,48 from which outwardly project rollers which engage the channel of inner mast support members 23,24. A pair of these upper rollers 49,50 are illustrated in FIG. 2. A corresponding pair of lower rollers (not shown) would be provided also. Thus, the fork assembly 41 may reciprocate upwardly or downwardly relative to the inner mast.

Provided at the upper end of the inner mast are a pair of chain idlers 60 and 61. Provided at the lower end of the inner mast is a pair of lower idlers 62 and 63. Each of these pair of idlers 60,61 and 62,63 are associated with upper and lower corresponding pairs of chains. Referring primarily to the left hand side of FIG. 2, one end of a pair of upper chains 64,65 is connected at 66 and 67 to a yoke 55 connected between the outer mast support members 21 and 22. These chains 64,65 run over their respective idlers 60,61 and the opposite ends of the chains 64,65 are connected, as at 68, to a crossmember 46 of the fork assembly. Of course, chain 65 does the same. However, only the upper portion of the right hand upper chain 65 has been shown so that the function of the pair of lower chains 70 and 71 may be understood. Likewise, only a portion of the lower chain 70 has been shown to more fully show the operation of the left hand upper chain 64. The lower chains 70,71 terminate at 72 and 73 in a connection with the yoke member 55. From these points of termination 72,73 the lower pair of chains 70,71, as best illustrated by chain 71 on the right hand side of FIG. 2, run around idlers 62 and 63 and back up to the fork assembly cross piece 45 where they terminate in a connection such as the connection 74.

It will be understood from the laws of mechanics that if hydraulic fluid pressure is applied to the base of the double acting hydraulic cylinder 35 causing the inner mast to move upwardly one foot relative to the outer mast, the fork assembly 41, due to the chain and idler interconnection will move upwardly one foot relative to the inner mast but two feet relative to the outer mast. However, there is a loss of mechanical advantage. For example, if an upward force F is applied by the hydraulic cylinder 35, the fork assembly 41 will only lift a load of one half F. For present purposes, it is sufficient to know that extension or retraction of the cylinder 35 will extend or retract the mast assembly and lift or lower the fork assembly 41.

Referring now more specifically to FIG. 1, the rearward carriage assembly 2 comprises a pair of outer support plates, only one 80 of which is shown in FIG. 1, transversely connected by structural support members (not shown) and below which is attached a pair of swivel or castered wheels 81 (or a single wheel). The wheels 81 are mounted on opposite sides of a wheel strut 82 which is mounted in a bearing assembly 83 for free swiveling about a vertical axis. Mounted on the rear carriage assembly is an internal combustion engine 84 having an output pulley 85 which drives a belt 86 which in turn engages pulleys 87, 88 and 89 attached to the shafts of three pumps (not shown). One of these pumps is preferably a positive displacement pump which is connected to the lift ram 35 and one or more other hydraulic piston and cylinders 108 to be more fully described hereafter. The other two pumps are variable displacement pumps, each one of which is connected to one of the hydraulic motors 12 or 13 which drives corresponding wheels 10 and 11. Of course other types of power transmission devices may be used. The variable displacement pumps are controlled by push-pull cables or linkages (not shown) manipulated by a single joy stick which provide forward, reverse and turning motion by articulation of pump control levers. Speed is infinitely variable, forward and reverse. The wheel pump controls and other controls for the pumps connected to the cylinder 35 and piston and cylinder 108 are located for operation by an operator seated on a seat 90, preferably near the center of the lift truck T. A redundant set of controls (not shown) may be provided at the forward carriage assembly 1 to facilitate folding.

The forward carriage assembly 1 and rearward carriage assembly 2 are connected by first and second transversely spaced apart support members. In the preferred embodiment, there is a first or left hand pair of support members and a second or right hand pair of support members. The first pair (left hand pair) of support members shown in FIG. 1 includes an upper elongated member 100 and a lower elongated member 101 of substantially equal length. The forward ends of the upper and lower elongated members 100,101 are pivotally attached to the forward carriage assembly by pins 102,103. The rearward ends of the elongated support members 100,101 are pivotally connected to the rear carriage 2 by pins 104,105. It will be noted that the distance between the center lines of pins 102 and 103 and the center lines of pins 104 and 105 are substantially equal. Thus, the elongated support members 100 and 101 and parallel lines drawn through the centers of corresponding pins 102,103 and 104,105 define a parallelogram. The second pair (right hand pair) of support members would be identical to upper and lower elongated members 100, 101 but on the opposite side of lift truck T.

Connected by a pivot connection 106 to the forward carriage assembly 1 (or by a pivot connection 106*a* to lower support member 101, as in FIG. 1A) and by pivot connection 107 to the upper support member 100 is an extendable and retractable double acting hydraulic cylinder 108. There could be only one cylinder 108 associated with one pair of support members 100,101 or two cylinders 108, one for each pair (left and right hand pairs). Of course, extension and retraction of the cylinder 108 will effect relative longitudinal displacement of the upper and lower support members 100,101 with each other. Such movement can also cause the forward carriage assembly 1, the mast components and the fork assembly 41 to tilt downwardly or upwardly, if desired. It can also be understood that if the forward carriage assembly is restrained from movement, extension of the cylinder 108, due to the parallelogram arrangement of the support member 100,101, will cause the support members 100,101 to pivot on the pins 102,103 from the relatively horizontal positions shown in FIG. 1 to the relatively vertical positions illustrated by dotted lines in FIG. 1. As this occurs, the rear carriage 2 and all the components supported thereby are elevated to a vertical position directly above the forward carriage 1. It will be noted as this is done, the rear carriage 2 and all the components thereof will maintain a substantially level disposition with the ground.

Figure 3:
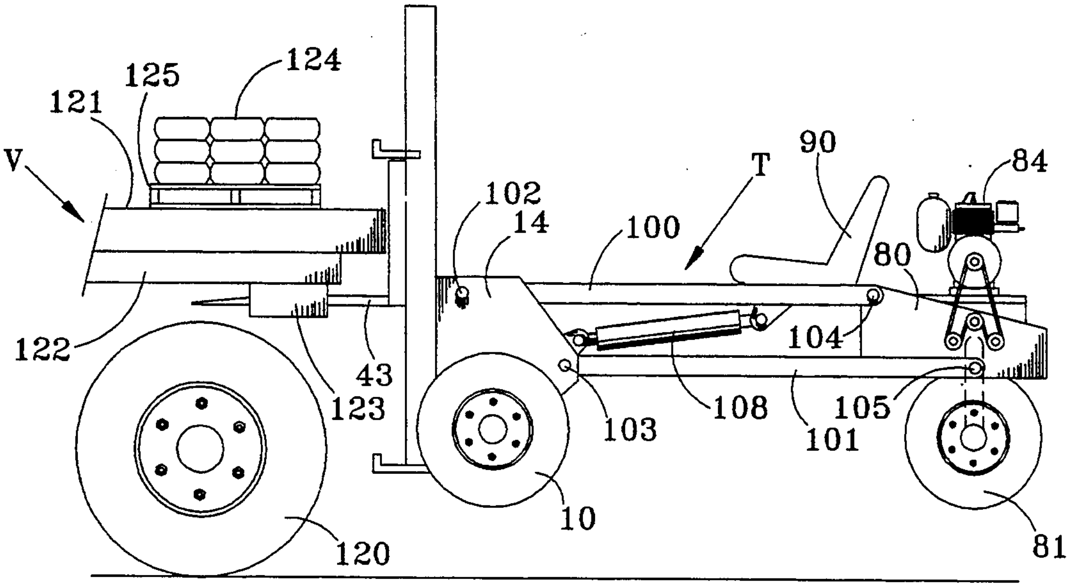
FIG. 3 is a side. elevation view of the self-propelled lift truck of FIGS. 1 and 2 showing the lift truck attached to and supported from the rear of a vehicle so that the lift truck is off of the ground.

Referring now to FIG. 3, there is shown the rear end of a vehicle V such as a truck or trailer having a rear wheel 120 a truck bed or surface 102 supported on a truck bed frame 122. The truck bed frame 122 on the truck chassis is provided with a pair of tubular horizontal supports 123 which are spaced to receive, if properly aligned in elevation and azimuth, the forks 43,44 of the fork assembly 41 of the lift truck T of the present invention. Initially, the lift truck T could be used to load materials, such as materials 124 shown on pallets 125, onto the vehicle V. After loading all the materials onto vehicle V the lift truck T would be driven to the rear of the vehicle V and the fork assembly 41 would be raised until the fork projections 43 and 44 are at a level corresponding with the tubular supports 103. Then the lift truck T would be driven forward so that the tines or prongs 43,44 of the fork assembly 41 would engage the tubular member 103 as shown in FIG. 3.

At this point, the hydraulic cylinder 35 would be activated for retraction. Since the fork assembly 41 is restrained in a vertically fixed position, the mast would be contracted and the entire lift truck T would be lifted off the ground as shown in FIG. 3. Once the lift truck T is lifted off of the ground a sufficient distance, the operator of the lift truck would walk to the forward carriage to operate the redundant set of controls and activate the hydraulic cylinder 108, extending the cylinder 108 and causing the support members 100,101 to pivot from the substantially horizontal position shown in FIG. 3 to the substantially vertical position shown in FIG. 4 and as previously described with reference to the dotted line position in FIG. 1. As previously stated, the engine 84 and all of the pumps and other components mounted on the rear carriage 2 remain in an erect position reaching a final vertical position directly above the forward carriage 1.

Figure 4:
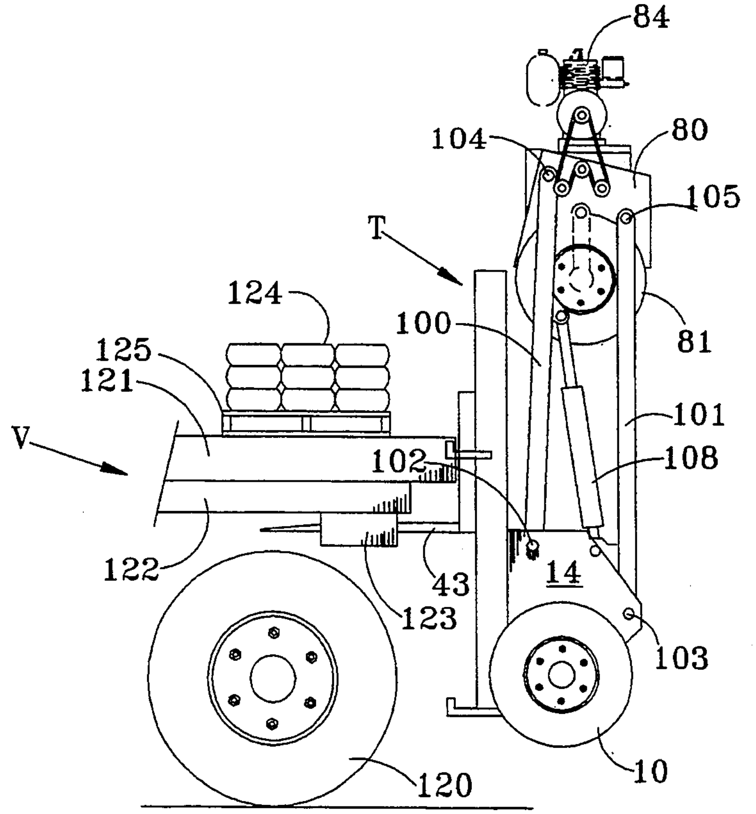
FIG. 4 is a side elevation view, similar to that of FIG. 3, showing the self-propelled lift truck of the present invention off the ground and pivoted from a horizontal position, such as shown in FIG. 3, to a vertical position for transportation on the vehicle to another location.

After reaching the folded position of FIG. 4, chains may be connected to the vehicle bed or bed frame 121,122 and to the elongated support members 100,101 so as to maintain the position of FIG. 4 for secure road travel. The operator may reverse the control of hydraulic cylinder 108 to snug the chains and drive the mast of the lift truck T against the rear of the trailer bed 101. The lift truck T is then in a secure position for highway travel.

When the destination of unloading is reached, the operator would direct flow to the cylinder 108 so that the pairs of support frames members move slightly forward, slacking the chains and allowing the chains to be disconnected. Then the operator would direct flow to the lift cylinder 35 extending the cylinder and the mast assembly and lowering the entire lift truck T, in the folded position of FIG. 4, until the front wheels 10 and 11 engage the ground. The operator would then direct flow to the cylinder 108 causing it to retract and unfolding the frame as the support members 100,101 pivot downwardly from the vertical positions to the horizontal positions of FIG. 1. Once the rear wheels 81 contact the ground, the operator may remount the seat and direct flow to the hydraulic motors 12 and 13 to back the lift truck away from the vehicle V. The lift truck T is then ready for unloading materials 124 from the vehicle V or any other work that is needed therefrom.

Thus, the self-propelled lift truck of the present invention provides moderately elevated lifting and unloading capabilities with ease of operation. A mast and fork assembly is carried on a forward carriage assembly which is connected to a rearward carriage assembly by a unique arrangement of support members. This arrangement provides tilting capabilities to the forward carriage assembly and the mast and fork assembly carried thereby. It also permits folding or pivoting movement of the support members and rearward carriage from a horizontal ground engaging position to a vertical position above the forward carriage while the forward carriage is restrained from movement. In addition, the mast axed fork assembly are connected in such a way that the entire lift truck may be self-elevated and carried, in a folded position, on the rear of a carrying vehicle.

A single embodiment of the invention has been described herein. However, many variations can be made without departing from the spirit of the invention. For example, the pairs of support members 100,101 could be single members with the engine 84 attached directly to the rear ends thereof. In such a case, the engine 84 would not remain horizontal when folded. The engine would rotate ninety degrees. In any event, it is intended that the scope of the invention be limited only by the claims which follow.

What is claimed is:

1. A self-propelled lift truck having a fork assembly for lifting and lowering of loads thereon, said lift truck comprising:

a forward carriage assembly which includes a pair of spaced apart ground engageable wheels and a vertical mast on which is mounted a forwardly projecting fork assembly for relative upward and downward movement thereon;

a rearward carriage assembly which includes at least one ground engageable wheel;

first and second transversely spaced apart elongated support members connecting said forward and rearward carriage assemblies, forward ends of said elongated support members being pivotally attached to said forward carriage assembly and rearward ends of which are attached to said rearward carriage assembly; and power means connected to said support members, activation of said power means effecting pivotal movement and angular displacement of said elongated support members relative to said forward carriage assembly.

2. A self-propelled lift truck as set forth in claim 1 in which said power means, if said forward carriage assembly is restrained from movement, will cause said support members to pivot at said attachment with said forward carriage assembly between relatively horizontal positions and relatively vertical positions.

3. A self propelled lift truck as set forth in claim 1 in which said power means comprises an extendable and retractable hydraulic device, extension and retraction of which effects said relative angular displacement of said elongated support members with said forward carriage assembly.

4. A self-propelled lift truck as set forth in claim 3 in which said hydraulic device comprises a cylinder and reciprocating piston rod, the distal end of said piston rod being connected to either said elongated support members or said forward carriage assembly, the opposite end of said cylinder being connected to the other of said elongated support members or said forward carriage assembly.

5. A self-propelled lift truck as set forth in claim 3 in which there are two of said extendable and retractable hydraulic devices one for each of said support members.

6. A self-propelled lift truck as set forth in claim 5 in which in which one end of each of said hydraulic devices is connected to one of said elongated support members, an opposite end of each of said hydraulic devices being connected to said forward carriage assembly.

7. A self-propelled lift truck as set forth in claim 1 in which said vertical mast and said fork assembly are operatively connected and provided with power lift means for effecting said upward and downward movement of said fork assembly relative to said mast so that if said fork assembly is restrained in a vertically fixed position, said mast, said carriage assemblies and said connecting support members may be lifted off the ground by said power lift means.

8. A self-propelled lift truck as set forth in claim 7 in which operation of said power means, when said fork assembly is in aid restrained vertically fixed position, may cause said support members to pivot about said forward ends thereof, approximately ninety degrees, from substantially horizontal positions to substantially vertical positions elevating said rearward carriage above said forward carriage.

9. A self-propelled lift truck as set forth in claim 8 in which subsequent operation of said power means may cause said support members to pivot about said forward ends thereof approximately ninety degrees to return from said substantially vertical position to said substantially horizontal positions.

10. A self-propelled lift truck as set forth in claim 9 in which subsequent operation of said power lift means may lower said mast so that said carriage assemblies reengage the ground and permit release of said fork assembly from said vertically fixed position.

11. A self-propelled lift truck having a fork assembly for lifting and lowering of loads thereon, said lift truck comprising:

a forward carriage assembly which includes a pair of spaced apart ground engageable wheels and a vertical mast on which is mounted a forwardly projecting fork assembly for relative upward and downward movement thereon;

a rearward carriage assembly which includes at least one ground engageable wheel;

first and second transversely spaced apart pairs of support members connecting said carriage assemblies, each of said pairs having upper and lower elongated members of substantially equal length forward ends of which are pivotally attached to said forward carriage assembly and rearward ends of which are pivotally attached to said rearward carriage assembly, a distance between said forward ends of said upper and lower elongated support members being substantially equal to a distance between said rearward ends of said upper and lower elongated members; and power means connected to at least one member of each pair of said support members, activation of said power means effecting relative longitudinal displacement of said upper and lower elongated support members with each other.

12. A self-propelled lift truck as set forth in claim 11 in which the length and relative spacing of the ends of said upper and lower elongated support members of each of said pairs of support members is such that if said forward carriage assembly is restrained from movement, activation of said power means will cause said pairs of support members to pivot at said attachment with said forward carriage assembly between relatively horizontal positions and relatively vertical positions.

13. A self propelled lift truck as set forth in claim 11 in which said power means comprises an extendable and retractable hydraulic device, extension and retraction of which effects said relative longitudinal displacement of said upper and lower elongated support members.

14. A self-propelled lift truck as set forth in claim 13 in which said hydraulic device comprises a cylinder and reciprocating piston rod, one end of said hydraulic device being connected to an upper elongated support member of at least one pair of said support members, the opposite end of said hydraulic device being connected to either a lower elongated support member of said one pair of said support members or to said forward carriage assembly.

15. A self-propelled lift truck as set forth in claim 13 in which there are two of said extendable and retractable hydraulic devices one for each pair of said support members.

16. A self-propelled lift truck as set forth in claim 15 in which one end of each of said hydraulic devices is connected to one end of the upper elongated support member of its corresponding pair of support members, the opposite end of said hydraulic device being connected to either the opposite end of said lower elongated support member of its corresponding pair or to said forward carriage assembly.

17. A self-propelled lift truck as set forth in claim 11 in which said vertical mast and said fork assembly are operatively connected and provided with power lift means for effecting said upward and downward movement of said fork assembly relative to said mast so that if said fork assembly is restrained in a vertically fixed position, said mast, said carriage assemblies and said connecting pairs of support members may be lifted off the ground by said power lift means.

18. A self-propelled lift truck as set forth in claim 17 in which operation of said power means, when said fork assembly is in said restrained vertically fixed position, may cause said pairs of support members to pivot about said forward ends thereof, approximately ninety degrees, from substantially horizontal positions to substantially vertical positions elevating said rearward carriage above said forward carriage.

19. A self-propelled lift truck as set forth in claim 18 in which subsequent operation of said power means may cause said pairs of support members to pivot about said forward ends thereof approximately ninety degrees to return from said substantially vertical position to said substantially horizontal positions.

20. A self-propelled lift truck as set forth in claim 19 in which subsequent operation of said power lift means may lower said mast so that said carriage assemblies to engage the ground and permit release of said fork assembly from said vertically fixed position.

* * * * *